Jan. 23, 1945.                B. H. SMITH                2,367,968
                          MEASURING INSTRUMENT
                    Filed April 10, 1940          4 Sheets-Sheet 1

WITNESSES:                                        INVENTOR
                                                  Benjamin H. Smith,
                                                  BY
                                                     ATTORNEY Jan. 23, 1945.　　　　B. H. SMITH　　　　2,367,968
MEASURING INSTRUMENT
Filed April 10, 1940　　　4 Sheets-Sheet 2

WITNESSES:

INVENTOR
Benjamin H. Smith.
BY
ATTORNEY

Patented Jan. 23, 1945

2,367,968

UNITED STATES PATENT OFFICE 2,367,968

MEASURING INSTRUMENT

Benjamin H. Smith, Bloomfield, N. J., assignor to Westinghouse Electric & Manufacturing Company, East Pittsburgh, Pa., a corporation of Pennsylvania Application April 10, 1940, Serial No. 328,871

19 Claims. (Cl. 171—34)

This invention relates to electrical measuring instruments and it has particular relation to electrical meters for measuring the product of volt-amperes of an electrical circuit.

Consumers of alternating electrical energy are most commonly charged on the basis of the number of watthours consumed over a predetermined billing period, such as one month. When all consumers operate at unity power factor, or at a common power factor, such a system may be satisfactory. However, the consumers of electrical energy ordinarily operate at different power factors. If a consumer operating at unity power factor is charged at the same watthour rate as one operating at a lagging power factor, it appears clear that the consumer operating at unity power factor is being penalized. For this reason, it is desirable to have available a meter capable of properly measuring volt-ampere consumption.

To the best of applicant's knowledge, the only volt-ampere meter commercially manufactured in the entire country is that represented by the Smith Patent 1,757,597, which is assigned to the Westinghouse Electric & Manufacturing Company. Although this meter has proven to be extremely satisfactory for large consumers of electrical energy, it has failed to reach a large field of consumers because of its size and the care required in its construction, which contribute to the expense of the meter. Such a meter comprises two meter units in side-by-side relationship. One of these meter units is designed for measuring the watt consumption of an electrical circuit and the other unit is designed for measuring the vars or reactive volt-amperes of the electrical circuit. A ball mechanism is placed between the two meter units for vectorially combining the outputs of the two units to indicate or record volt-amperes or volt ampere hours.

In accordance with this invention, a compact volt-ampere meter is provided by axially aligning a wattmeter unit and a varmeter unit. In the space available between the two meter units, a ball mechanism is provided for vectorially adding the outputs of the two meter units to indicate or record volt-amperes or volt-ampere hours. The couplings between the meter units and the ball mechanism are located adjacent each other in order to facilitate attachment and removal of the ball mechanism as a complete unit. In addition, the gearing required is greatly simplified by a number of modifications. In order to eliminate certain gearing, the wattmeter unit and the varmeter unit are designed to rotate in opposite directions. Also, the gearing between the ball mechanism and the indicating or recording mechanism is greatly simplified.

It is accordingly an object of my invention to provide a compact volt-ampere meter.

It is a further object of my invention to provide a volt-ampere meter having a wattmeter unit and a varmeter unit disposed in axial alignment.

It is another object of my invention to provide a volt-ampere meter having a readily detachable register or translating means.

It is a further object of my invention to provide an improved bearing construction for a meter.

It is another object of my invention to provide couplings between a register or translating means and the meter units of a volt-ampere meter which are substantially axially aligned.

It is a further object of my invention to provide a volt-ampere meter wherein a wattmeter unit and a varmeter unit are designed to rotate in opposite directions.

It is a still further object of my invention to provide a volt-ampere meter having simplified gearing.

Other objects of my invention will be apparent from the following description taken in conjunction with the accompanying drawings, in which.

Figures 1, 2:
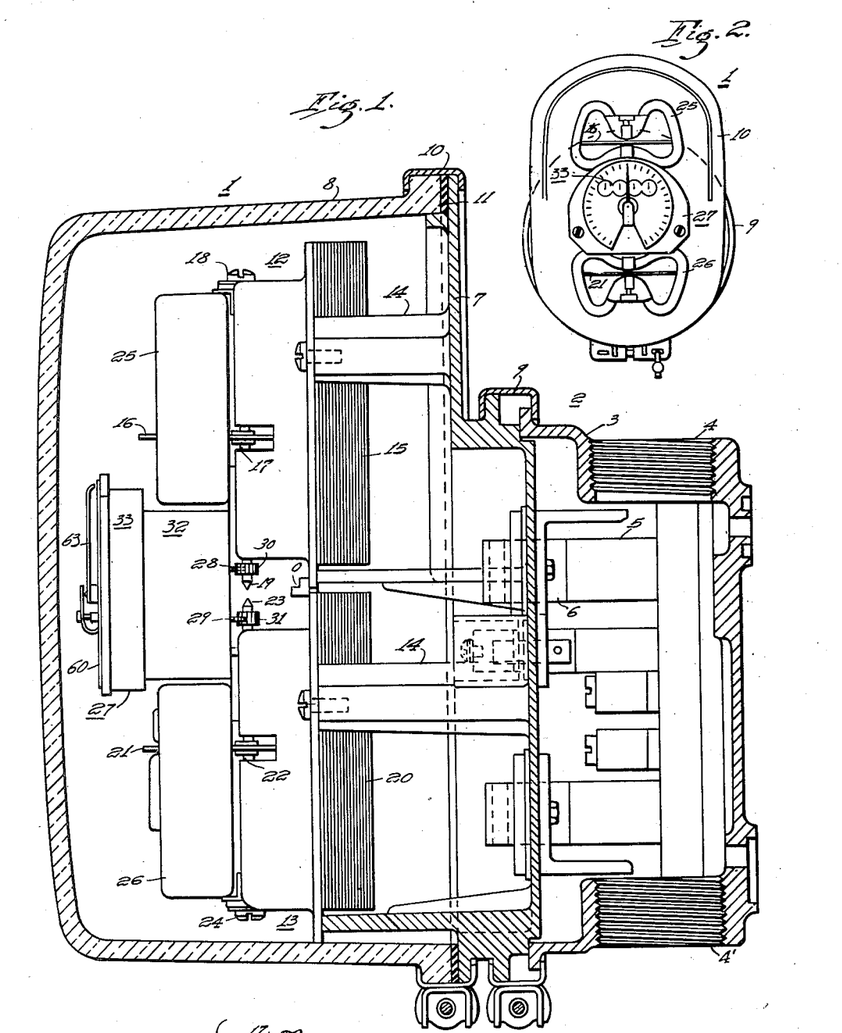
Figure 1 is a sectional view in side elevation of a volt-ampere meter embodying the invention.
Fig. 2 is a view in front elevation of the meter shown in Fig. 1 with the cover removed.

Referring to the drawings, Fig. 1 shows a meter 1 mounted on a suitable meter base 2. For the purpose of illustration, the meter 1 and the base 2 are shown as parts of a detachable meter assembly. The base 2 may comprise a socket 3 having a threaded inlet 4 and a threaded outlet 4' for suitable wiring conduit. The socket also contains a plurality of contact jaws 5 for detachably receiving contact blades 6 carried by the meter 1. The meter 1 includes a supporting member 7 provided with a cover 8 which may be of glass. The supporting member 7 and the socket 3 are provided with flanges which may be received within a seal ring 9 for protecting the meter against tampering. Similarly, a sealing ring 10 may be associated with flanges provided on the supporting member 7 and the cover 8. If desired, a resilient gasket 11 may be interposed between the supporting member 7 and the cover 8. Further details of the construction of the cover, supporting member and socket may be obtained by reference to the Mylius Patent 2,117,904 wherein a similar construction is disclosed.

Two meter units 12 and 13 are mounted on suitable pillars 14 carried by the supporting member 7. Each of the meter units 12 and 13 may be of any suitable construction and may be for either single-phase or polyphase operation. A suitable meter unit for polyphase operation is illustrated for example in the Bradshaw Patent 2,081,981, which is assigned to the Westinghouse Electric & Manufacturing Company. For the purpose of illustration, however, these meter units will be described as single phase units.

The upper meter unit 12 includes an electromagnet 15 which is employed for rotating an electroconductive armature or disc 16. This disc is mounted on a shaft 17 which is supported for rotation by an upper bearing 18 and a lower bearing 19. Similarly, the lower meter unit comprises an electromagnet 20 which is employed for rotating an electroconductive armature or disc 21. The disc 21 is mounted on a shaft 22 which is supported for rotation by an upper bearing 23 and a lower bearing 24. The various bearings may be of any desired construction, but preferably the lower bearings 19 and 24 are of the ball type illustrated, for example, in the Paszkowski Patent 1,728,507. The upper bearings may be of the pin type illustrated by Paszkowski.

Figure 2A:
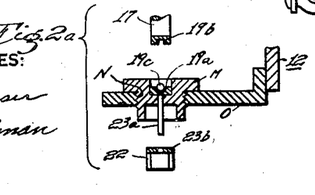
Fig. 2a is a detail view in section of a common intermediate bearing unit suitable for the meter of Fig. 1.

Conveniently the bearings 19 and 23 may be supported by a common structure as illustrated in Fig. 2a. This common structure may take the form of a threaded member M supported in a threaded opening N formed in a bracket O carried by one of the meter units. The member M is provided with a jewel cup 19a for the lower bearing of the upper meter unit 13, and with a guide bearing pin 23a for the upper bearing of the lower meter unit 13. The upper shaft 17 is provided with a jewel cup 19b (which is shown displaced from the cup 19a for clarity). Between these cups a bearing ball 19c is located. The lower shaft carries a bearing collar 23b for receiving the pin 23a (shown displaced in Fig. 2a).

Each of the meter units is provided with a permanent magnet for damping rotation of the associated armature or disc. It will be noted that the upper permanent magnet 25 has a major portion projecting above the associated disc 16 whereas the lower permanent magnet 26 has a major portion projecting below its associated disc 21. The permanent magnets 25 and 26 may be similar in design but inverted relative to each other. The purpose of this inversion is to provide sufficient space for a suitable translating means 27. As illustrated, the translating means is coupled to the meter unit by two coupling gears 28 and 29 which engage pinions 30 and 31 mounted on the respective shafts of the meter units.

It will be understood that each electromagnet 15 or 20 may be energized from an electrical circuit to rotate its armature or disc in accordance with the watts or vars of the electrical circuit.

The meter units 12 and 13 may be associated in various manners to perform various measuring operations. For example, if the shafts 17 and 22 are integral with each other, or are coupled to each other through the translating means 27, the resulting meter may be employed for polyphase metering in the same way as the meter illustrated in the aforesaid Mylius Patent 2,117,904.

If the meter units 12 and 13 are designed to respond to the watts or vars of an electrical circuit, each meter unit may be employed independently for actuating a suitable register or recording means to indicate watthours, varhours, or any other suitable quantity.

The construction illustrated in Fig. 1 is particularly suitable for volt-ampere measurements and its application will be described with reference to such measurements.

For measuring volt amperes or volt-ampere hours, the translating means 27 comprises a ball mechanism 32 and a register or other recording means 33. Furthermore, one of the meter units, as the top unit 12, is designed to measure vars and the remaining unit, in this case the lower unit 13, is designed for measuring watts of an electrical circuit.

In order to obtain a quantity representing the volt-amperes of an electrical circuit, it is necessary to vectorially combine or add the outputs of the wattmeter unit 13 and the varmeter unit 12. This addition is obtained by means of the ball mechanism 32, which is illustrated more particularly in Fig. 3. The ball mechanism includes a spherical member or ball 34 which may be constructed of any suitable material such as steel or preferably aluminum. The ball 34 rests in contact with the circular peripheries of two discs 35 and 36. One of these discs 36 is carried by a shaft 37, which, in turn, is connected through a gear 38, a pinion 39 and a shaft 40 to the gear 28 for rotation by the wattmeter unit 13. Similarly, the disc 35 is carried by a shaft 41 which is connected through a gear 42, a pinion 43 and a shaft 44 to the gear 28 for rotation by the varmeter unit 12.

For reasons that will be apparent hereinafter, the discs 35 and 36 are rotated in opposite directions. If it is desired to have the varmeter unit 12 and the wattmeter unit 13 rotate in the same direction, idler gearing may be employed for reversing the direction of rotation of one of the discs 35 or 36 relative to the other disc. However, I prefer to eliminate such idler gearing by reversing the direction of rotation of one of the meter units 12 or 13, as indicated by arrows A and B in Fig. 3.

Figure 3:
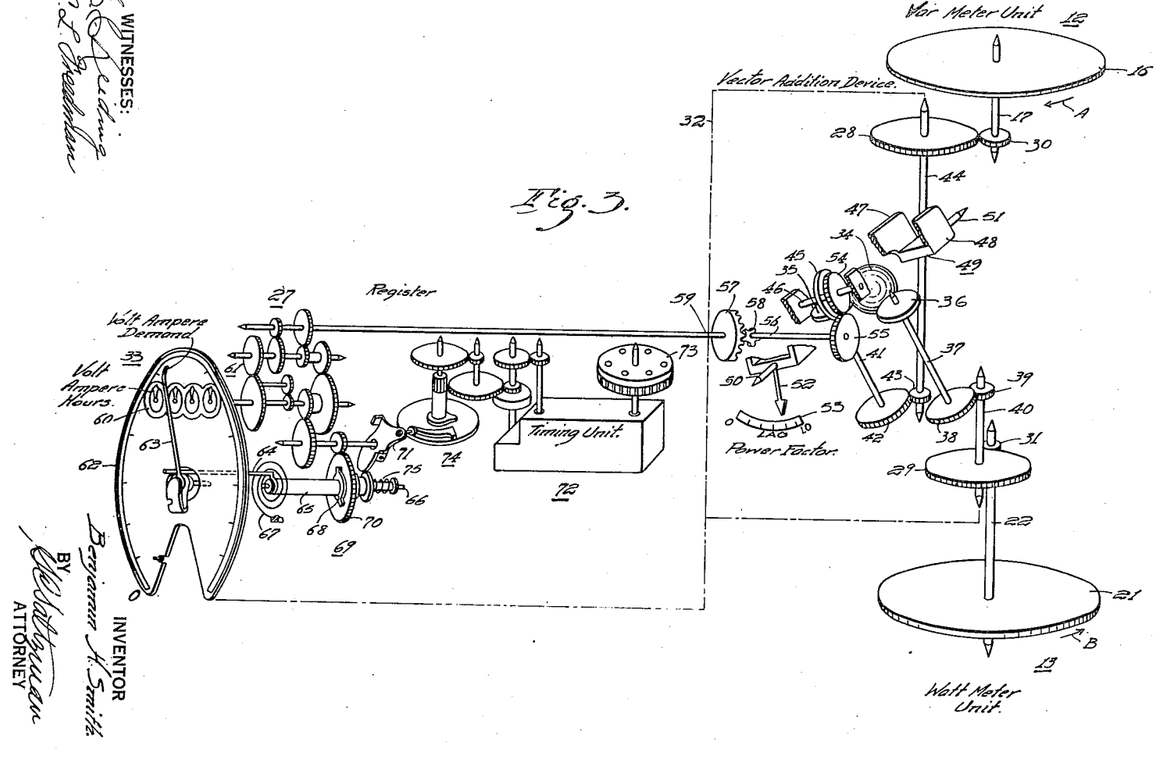
Fig. 3 is a view in perspective with parts spread to indicate the relationships therebetween of the meter shown in Fig. 1.

The ball 34 is so mounted that a plane containing the axes of the shafts 37 and 41 passes through the center of the ball and through the points of contact of the ball with the discs 35 and 36. This position of the ball is determined by a rider or collector disc 45 which is mounted for rotation on a shaft 46 journalled in the side members 47 and 48 of a suitable carriage 49. The carriage is provided with two aligned stub shafts 50 and 51 which are journalled in suitable bearings for permitting rotation of the carriage 49 about the axis of the stud shafts 50 and 51.

It is believed that a further description of the mechanism will be understood more clearly if a brief discussion of the operation of the ball 34 is given at this time. It will be noted that the discs 35 and 36 are rotated oppositely in accordance with the rotations of the varmeter unit 12 and the wattmeter unit 13. These discs 35 and 36, in turn, impart a rotation to the ball 34 about an axis which varies in accordance with the relative rotations of the discs. For example, if the meter is employed for measuring the volt amperes of an electrical circuit operating at unity power factor, the varmeter unit 12 and, consequently, the disc 35 remain stationary. Therefore, the rotation of the disc 36 tends to rotate the ball 34 about an axis passing through the center of the ball and the point of contact of the ball with the stationary disc 35. As a further example, if the meter is employed for measuring the volt amperes of an electrical circuit operating at zero power factor, the wattmeter unit 13 and the disc 36 remain stationary and the disc 35 tends to rotate the ball 34 about an axis passing through the center of the ball and the point of contact of the ball with the stationary disc 36. For intermediate power factors, the axis of rotation of the ball 34 assumes an intermediate position.

Referring now to the operation of the rider or collector disc 45, it will be noted that this disc is carried by a structure permitting it to rotate about axes at right angles to each other. For any condition of rotation of the ball 34, the disc 45 tends to enter a plane perpendicular to the axis of rotation of the ball. Consequently, the position of the carriage 49 may be employed through a suitable pointer 52 carried thereby for indicating on a scale 53 the power factor of the electrical circuit to which the meter is connected.

Referring to the first example of unity power factor, the ball 34 rotates about an axis passing through the center of the ball and the point of contact of the ball with the disc 35. The rider disc 45 in turn enters a plane perpendicular to the axis of rotation of the ball and carries the pointer 52 to the unity power factor marking on the scale 53. For the second example of zero power factor, the ball 34 rotates about an axis passing through the center of the ball and the point of contact of the ball with the disc 36. In entering a plane perpendicular to this axis, the rider disc 45 carries the pointer 52 to the zero power factor marking on the scale 53.

Assuming proper relationships of the various parts, the rate of rotation of the disc 45 in every case is proportional to the vector sum of the rotations of the discs 35 and 36 and, consequently, of the varmeter unit 12 and the wattmeter unit 13. That is, the rate of rotation of the disc 45 is proportional to the volt amperes of the electrical circuit to which the meter is connected.

It has been the practice to mount a disc corresponding to the disc 45 in such a position that the plane of the disc includes substantially the center of the ball 34. Because of the rotation of the carriage 49, this has introduced considerable difficulty in transmitting the rotation of the disc 45 to a suitable register or recording device. Complicated gearing has been employed for this purpose in the prior art.

I have found it permissible to mount the disc 45 in a plane parallel to, but displaced from, a plane containing the center of the ball 34. This permits the placement of a driving gear 54 on the shaft 46 with the plane of the gear 54 substantially containing the center of the ball 34. The disc 45 and the gear 54, which is small enough to clear the ball, are mounted for rotation as a unit whereby the rotation of the gear 54 is governed by the rotation of the disc 45. The gear 54 operatively engages a driven gear 55 which is carried by a rotatable shaft 56. By reference to Fig. 3, it will be noted that the point of contact between the gears 54 and 55 or the point of contact of the pitch lines of these two gears is substantially tangent to the axis of rotation of the carriage 49 and that this axis passes through the center of the ball 34. Consequently, the gear 54 may rotate freely for a substantial distance about the axis of the carriage 49 without losing its operative engagement with the driven gear 55. For most purposes, the gears 54 and 55 may be ordinary spur gears.

Since the gear 54 is positioned in a plane containing the center of the ball 34, it follows that the rider disc 45 must be displaced from this plane. Consequently, the great circle of the ball 34 which is perpendicular to the axis of rotation of the ball does not engage the disc 45. Instead of this, a smaller circle parallel to this great circle is responsible for the rotation of the disc 45. Since the ratio between the smaller driving circle and the great circle is constant, it follows that the rotation of the disc 45 is proportional to the rate of rotation of the great circle and to the volt amperes of the circuit to which the meter is connected.

By suitable selection of gearing, a register or recording device 33 may be connected through the shaft 56 and the gears 55 and 54 to the disc 45 to indicate or record directly volt amperes or volt-ampere hours. In the specific illustration of Fig. 3, the register 33 is connected to the shaft 56 through a crown gear 57 and a pinion 58 carried by the shaft 56. The crown gear 57 is carried by a shaft 59 which consequently rotates at a rate proportional to the volt amperes of an electrical circuit to which the meter is connected.

For registering or recording the rotation of the shaft 59, any suitable register or recording device may be employed. For example, a logarithmic maximum-demand register of the type illustrated in my Patent 2,003,016 may be employed. For the purpose of illustration, however, a block-interval, maximum-demand register has been illustrated in Fig. 3. This register includes a volt-ampere-hour integrator 60 which is connected through suitable gearing 61 to the shaft 59. During the operation of the meter, the integrator 60 will show at all times the total volt-ampere-hours or kilovolt-ampere-hours measured by the meter.

The indicating face of the register 33 also includes a volt-ampere demand scale 62 which cooperates with a friction pointer 63. The friction pointer is so mounted that it is held in any position to which it is advanced.

For advancing the pointer 63, a pusher arm 64 is carried by a sleeve 65 rotatably mounted on a shaft 66. The sleeve 65 is biased by means of a spring 67 towards its zero or initial position and carries a driven element 68 of a friction clutch 69. The driving element of the clutch 69 is rotated by means of a gear 70 which is suitably connected to the gearing 61 for rotation by the shaft 59. At periodic intervals, customarily every 30 minutes, the clutch elements are disengaged by operation of a clutch throwout lever 71. For this purpose, a timing unit 72 is provided which may be driven by any suitable mechanism, such as clockwork, or by a synchronous motor 73, preferably of the type illustrated in the Lenehan Patent 2,140,365. At the end of each 30 minute interval, the timing unit operates through a suitable cam mechanism 74 to actuate the throwout lever 71 momentarily, thereby disengaging the clutch 69. Normally, the clutch 69 is biased in its engaged position by means of a spring 75 associated therewith.

From the foregoing description, it will be understood that the pusher arm 64 is actuated in accordance with the volt amperes measured by the meter for a 30 minute interval. At the end of each 30 minute interval, the pusher arm 64 is reset to its zero position in order to start a succeeding 30 minute interval of operation. Consequently, the pointer 63 over a billing period, such as one month, will be actuated to a position corresponding to the maximum volt-ampere demand for a 30 minute interval. For a more detailed description of the register, reference may be made to the Lewis et al. Patent 2,047,376.

It is believed that the operation of the meter illustrated in Fig. 3 now will be understood. The meter is so connected to an electrical circuit that the varmeter unit 12 is energized in accordance with the vars or reactive volt amperes of the electrical circuit and the wattmeter unit 13 is energized in accordance with the watts of the electrical circuit. With such an energization of the meter units, the discs 35 and 36 will be rotated in accordance with the vars and watts, respectively, of the electrical circuit.

Because of its contact with the discs 35 and 36, the ball 34 will rotate about an axis dependent upon the rotation of one disc relative to the other. The rotation of the ball 34, in turn, is imparted to the rider disc 45. Since this rider disc is mounted for rotation about the axis of the stub shafts 50 and 51, the rider disc will rotate into a plane substantially perpendicular to the axis of rotation of the ball 34. This position of the rider disc, as indicated by the pointer 52 on the scale 53, represents the power factor of the electrical circuit and the rotation of the disc 45 is proportional to the volt amperes of the electrical circuit. In other words, the ball 34 vectorially adds the rates of rotation of the discs 35 and 36, the vector sum of these rates of rotation being imparted to the rider disc 45.

The rotation of the rider disc is transmitted through the gear 54 (which rotates with the rider disc) to the gear 55. The gear 55, in turn, is connected in any suitable manner as by the shaft 56 and the gears 57 and 58 for rotating the operating shaft 59 of any suitable register. Consequently, the register associated with the shaft 59 is actuated in accordance with the volt amperes of the electrical circuit.

It will be noted that the gearing between the meter units 12 and 13 and the register crown gear 57 comprises simple spur gears. Even the crown gear 57 may be replaced by a spur gear if the shaft 59 is placed parallel to the shaft 56. Generally, the desired position of parts is such that the shafts 59 and 56 are at right angles, as illustrated in the drawings. The use of simple spur gears is made possible by maintaining the shafts 17, 22, 40, 44, 37 and 41 as parallel as permissible.

From an inspection of the drawings, it will be noted that the shafts 37 and 41 are not exactly parallel to their cooperating shafts 40 and 44. If these shafts all were exactly vertical, the discs 35 and 36 would be in a horizontal plane, and the center of gravity of the ball 34 would lie substantially within a plane containing the axes of the shafts 37 and 41. Consequently, the ball 34 would be in an unstable position and a guide member would be required for retaining the ball in contact with the three discs 35, 36 and 45.

In order to avoid the requirement of a guide member, the parts associated with the ball 34 including the carriage 49 and the shafts 37 and 41 are tilted about the axis of the shaft 56. Because of this tilting, the center of gravity of the ball 34 falls among the points of contact of the three discs 35, 36 and 45 with the ball. Therefore, gravity retains the ball in a stable position biased against the rider disc 45. Because of the small tilt required, satisfactory operation is obtained when spur gears are employed for the gears 38, 39, 42 and 43.

By reference to Fig. 1, it will be noted that the translating means 27 is positioned substantially in the space available between the two discs 16 and 21. Because of its compact construction, the translating means may be made readily detachable from the remainder of the meter. The compact construction of the translating means and especially of the ball mechanism is illustrated in detail in Figs. 4, 5 and 6. I have found that the ball may be substantially smaller than those heretofore employed for vector summation. For example, a ball one-half inch in diameter has been found satisfactory for the ball mechanism herein illustrated, and a ball three-eighths inch in diameter also has been found suitable.

Figure 4:
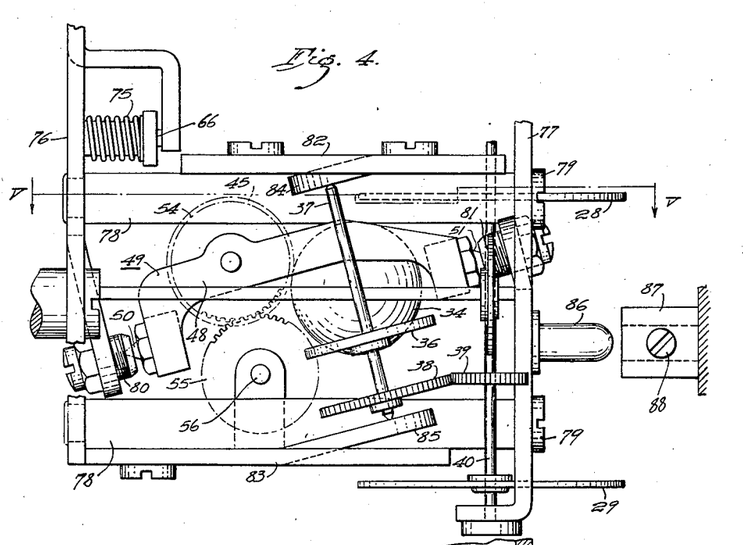
Fig. 4 is a detail view in side elevation of the ball mechanism employed in the meter of Fig. 1.
Figure 5:
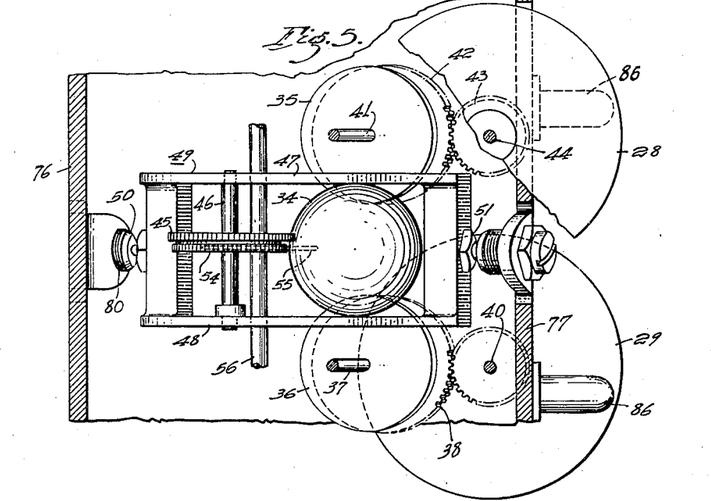
Fig. 5 is a detailed view taken along the line V—V of Fig. 4.
Figure 6:
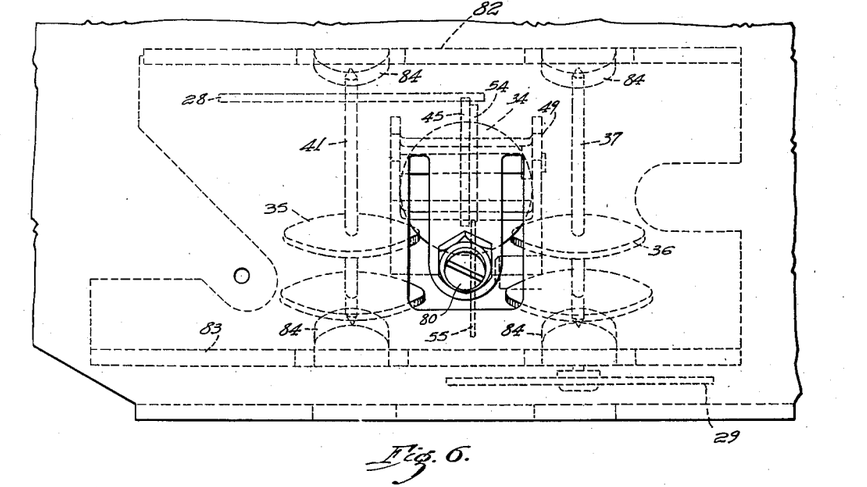
Fig. 6 is a view in front elevation of the ball mechanism illustrated in Fig. 4.

As illustrated in Figs. 4, 5 and 6, the ball mechanism is mounted between two plates 76 and 77 which may be united in any suitable manner as by pillars 78 riveted to the plate 76 and attached to the plate 77 by means of suitable screws 79. A portion of the spring 75 is shown in Fig. 4 to illustrate the position of the register mechanism relative to the ball mechanism. Portions of the plates 76 and 77 are bent suitably for receiving bearings 80 and 81 which may have threads for threadedly engaging the bent portions of the plates 76 and 77. These bearings are positioned to receive the stub shafts 50 and 51 of the carriage 49. Cross pieces 82 and 83 are provided between the plates 76 and 77. These cross pieces have bent bearing portions 84 and 85 which provide bearings for the shafts 37 and 41. The supporting plates 76 and 77 and cross pieces may be formed from sheet brass or other material, or conveniently these parts may be die cast.

For detachably positioning the translating means on the meter, any suitable fastening means may be employed. As illustrated in Fig. 4, the translating means may be provided with supporting pins 86 which may be inserted in collars 87 carried by the meter frame. Each collar 87 may be provided with a set screw 88 for retaining the pin in mounted position.

The attachment and detachment of the translating means is greatly facilitated by the positions of the coupling gears 28 and 29. By reference to Fig. 3, it will be noted that these gears are displaced vertically and horizontally. Because of the compact arrangement of the parts, this displacement is not appreciable. In addition, the horizontal displacement provides a centering action when the coupling gears 28 and 29 are moved towards the pinions 30 and 31 which are mounted in axial alignment.

One of the advantages flowing from the arrangement of shafts illustrated is that substantially all major shaft loads may be substantially vertical loads. This permits the use of jewelled end stone bearings or ball bearings of the type illustrated in the aforesaid Paszkowski Patent 1,728,507. Such bearings are especially desirable on a high speed shaft for carrying the resulting shaft thrust with a minimum of friction.

The universal nature of the meter herein described may be appreciated by reference to the drawings. Either of the meter units 12 and 13 may be employed alone for measuring watts or vars in a conventional manner. Moreover, these units may be mounted in alignment with a common shaft extending between their discs for polyphase operation, as illustrated in the aforesaid Mylius patent. By providing independent shafts and substantially no other change in construction, the meter units are adapted for volt-ampere measurements. In addition, the translating means 27 may be readily interchanged because of its detachable construction to provide any desired registration or recording of the quantities being measured. This greatly reduces the number of basic parts required for a complete line of meters and registers.

Figures 7, 8, 9:
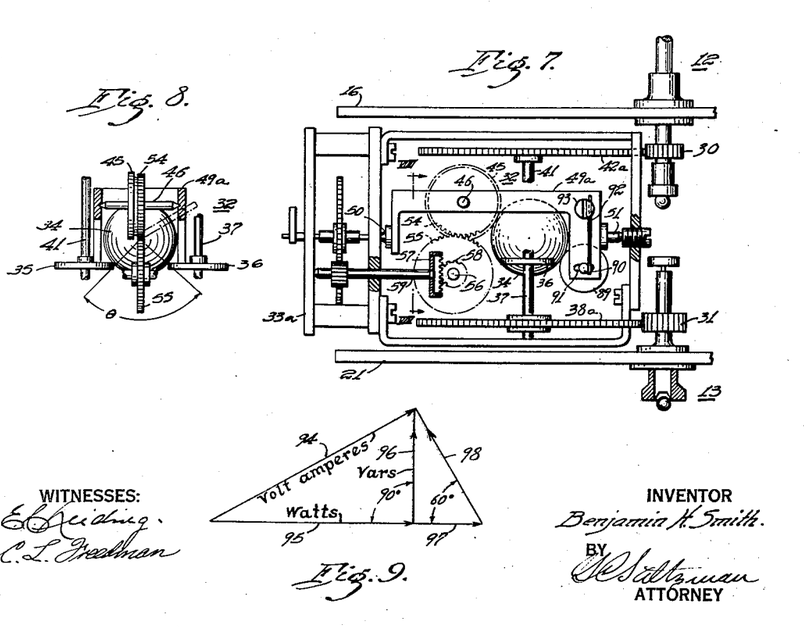
Fig. 7 is a view in side elevation of a modified ball mechanism embodying the invention.
Fig. 8 is a detail view taken along the line VIII—VIII of Fig. 7.
Fig. 9 is a vector diagram showing the relationship of quantities measured by a meter designed in accordance with my invention.

Referring to Figs. 7 and 8, a slightly modified form of the invention is illustrated. Most of the parts illustrated in Figs. 7 and 8 correspond to those illustrated in the earlier figures and bear similar reference characters. However, the carriage 49 of Figs. 3 to 6 is replaced by a modified carriage 49a, wherein the stub shafts 50 and 51 are mounted in horizontal alignment. In addition, the shafts 37 and 41 are mounted vertically and are provided with gears 38a and 42a which engage directly the pinions 30 and 31 mounted on the shafts of the meter units 12 and 13. As before, the shafts 37 and 41 carry discs 35 and 36. It will be noted that with this relationship of parts, the discs 35 and 36 are in a horizontal plane. That is, the ball mechanism of Figs. 7 and 8 corresponds to the mechanism of Fig. 3, if the ball mechanism of Fig. 3 is rotated about the axis of the shaft 56 to bring the shafts 37 and 41 into parallel relationship with the shafts 17 and 22.

With the parts as shown in Figs. 7 and 8, it will be noted that the ball 34 is in an unstable position. In order to prevent the ball from leaving the discs 35, 36 and 45, the carriage 49a is provided with a guide roller 89 which is mounted on a shaft 90 projecting through slots 91 in the side walls of the carriage 49a. Biasing means such as a leaf spring 92 is mounted on the carriage 49a by any suitable means, such as a machine screw 93, for biasing the shaft 90 and the guide roller 89 towards the ball 34. Consequently, the ball 34 is held in a stable position by the guide roller 89 and the discs 35, 36 and 45. As shown in Fig. 7, the shaft 59 is employed for actuating a simplified register 33a. The mechanism illustrated in Figs. 7 and 8 operates in substantially the same manner as that illustrated in Fig. 3. The compact nature of this construction will be appreciated when it is understood that a translating means similar to that illustrated in Fig. 7 has been inserted operatively between the discs of a small meter similar to that illustrated in the Bradshaw Patent 2,081,981. For this application, the discs shown in the Bradshaw patent are mounted for independent rotation in accordance respectively with the watts and vars of an electrical circuit.

As illustrated in Fig. 8, the points of contact of the discs 35 and 36, together with the center of the ball 34 define an angle $\theta$. In the meters of the prior art, this angle has been made equal to 90° for proper vectorial addition of the outputs of wattmeter units and varmeter units. I have found it possible to make this angle other than 90° by properly relating the oblique angle selected to the electrical angle of the meter units.

For example, when an oblique angle of $\theta = 60°$ is selected, the angular displacement between the vector components which the meter units 12 and 13 measure also must be 60°. This may be understood more clearly by reference to the vector diagram shown in Fig. 9.

As shown in Fig. 9, a vector 94 representing volt amperes may be represented by a vector component 95 corresponding to the watt component of volt amperes and a second vector component 96 corresponding to the var components or reactive volt ampere component of the resultant vector 94. If the meter units 12 and 13 are adjusted to measure respectively, the components 96 and 95, then the angle $\theta$ of Fig. 8 should be 90° in order properly to vectorially combine the outputs of the two meter units. However, if the resultant volt-ampere vector 94 is represented by a vector component 97 and a vector component 98, which are displaced from each other by 60°, and the meter units 12 and 13 are designed, respectively, to measure the vector components 98 and 97 then the angle $\theta$ of Fig. 8 should be 60°. In other words, the angle $\theta$ of Fig. 8 should be equal to the angle between the components into which the meter units 12 and 13 divide the quantity being measured.

The latitude obtained by making the angle $\theta$ an oblique angle may be desirable in certain applications. For example, it permits a larger ball 34 to be employed with the same spacing of the discs 35 and 36.

The unusual compactness of a meter designed in accordance with the invention is apparent from an inspection of Figs. 1 and 2. It will be noted that a projection of the translating means 27 in the plane of the meter units 12 and 13 need not project appreciably, if at all, from the meter units. Moreover, substantially all of the operating mechanism for the translating means may be placed between the indicating face of the register and the meter units 12 and 13. The compactness is desirable in many applications, especially for switchboard applications wherein the spacing between adjacent meters requires a narrow meter.

Although I have described the invention with reference to certain specific embodiments thereof, the invention is to be restricted only by the appended claims, as interpreted in view of the prior art.

I claim as my invention:

1. In a volt-ampere measuring instrument, a pair of rotatable shafts, means mounting said shafts substantially in axial alignment for independent rotation, electromotive driving means having armatures on said shafts for rotating said shafts in accordance with vector components of a volt-ampere quantity to be measured, a first coupling means for each of said shafts, said coupling means being positioned near adjacent ends of said shafts, translating means having a pair of coupling means operatively engaging said first coupling means for vectorially combining said vector components to determine said volt-ampere quantity, and means for detachably supporting said translating means as a unit in operative position relative to said first coupling means, 2. In a measuring instrument, a pair of rotatable shafts, means mounting said shafts substantially in vertical axial alignment for independent rotation, electromotive means having armatures on said shafts for rotating said shafts in accordance with different vector components of an alternating quantity to be measured, a first gear on each of said shafts, translating means for vectorially combining the rotations of said shafts, said translating means having gears for operatively engaging said first gears, and means detachably mounting said translating means as a unit in operative position relative to said first gears.

3. In an electrical measuring instrument, a pair of rotatable shafts, means mounting said shafts substantially in axial alignment for independent rotation, an armature member carried by each of said shafts, means cooperating with said armature members for rotating said shafts in accordance with quantities to be measured, translating means positioned between said armature members for operation by said shafts, a permanent magnet for each of said armature members, each of said permanent magnets projecting from a first face of its associated armature member a smaller distance than from a second face thereof, the first faces of said armature members being adjacent said translating means.

4. In an electrical measuring instrument, a pair of rotatable shafts, means mounting said shafts substantially in axial alignment for independent rotation, a disc armature member mounted on each of said shafts, said disc armature members providing a space therebetween, means for rotating said disc armature members and shafts in accordance with different vector components of a quantity to be measured, and translating means positioned substantially in said space for actuation by said shafts, said translating means including means for vectorially combining the rates of rotation of said shafts to provide a resultant proportional to the quantity to be measured.

5. In an electrical measuring instrument, a pair of rotatable shafts, means mounting said shafts substantially in axial alignment for independent rotation, a first coupling means for each of said shafts, a disc armature member mounted on each of said shafts, said disc armature members providing a space therebetween, means for rotating said disc armature members and shafts in accordance with different vector components of a quantity to be measured, translating means positioned substantially in said space for actuation by said shafts, said translating means including a pair of coupling means for operatively engaging said first coupling means, and means actuated through said coupling means for vectorially combining the rates of rotation of said shafts to provide a resultant proportional to the quantity to be measured, and means for detachably supporting said translating means as a unit in operative position relative to said first coupling means.

6. In an electrical measuring instrument, a pair of rotatable shafts, means mounting said shafts substantially in axial alignment for independent rotation, a first coupling means for each of said shafts, a disc armature member mounted on each of said shafts, said disc armature members providing a space therebetween, means for rotating said disc armature members and shafts in accordance with different vector components of a quantity to be measured, translating means positioned substantially in said space for actuation by said shafts, said translating means including a pair of coupling means for operatively engaging said first coupling means at predetermined points, the point of engagement for one of said first coupling means being displaced angularly around the axis of said shafts relative to the point of engagement for the other of said first coupling means.

7. In a measuring instrument, a pair of substantially axially aligned shafts, means mounting said shafts for independent rotation, electromotive means having armatures on said shafts for rotating said shafts at rates corresponding to vector components of a quantity to be measured, and translating means for vectorially combining the rotations of said shafts for providing a resultant dependent on the quantity to be measured, said translating means including a spherical member, a plurality of rotatable members for transmitting motion from said shafts to said spherical member, and means mounting said rotatable members for rotation about axes substantially parallel to said shafts.

8. In a measuring instrument, a pair of substantially parallel shafts, an armature member mounted on each of said shafts, means mounting said shafts for independent rotation, means cooperating with said armature members for rotating said shafts in opposite directions at rates corresponding to vector components of a lagging volt-ampere quantity to be measured, and translating means for vectorially combining the rotations of said shafts for providing a resultant rotation dependent on the quantity to be measured, said translating means including a pair of discs, means mounting said discs for rotation in a common plane, means for rotating each of said discs from a separate one of said shafts, and a spherical member engaging said discs at spaced points for actuation in accordance with said quantity.

9. In a measuring instrument, a pair of rotatable members, means mounting said rotatable members for rotation about spaced axes, each of said rotatable members having a circular periphery concentric with the axis of rotation thereof, both of said circular peripheries lying substantially in a common plane, a spherical member positioned in engagement with said circular peripheries for rotation by said rotatable members, and measuring means responsive to the rotation of said spherical member.

10. In a measuring instrument, a pair of rotatable members, means mounting said rotatable members for rotation about spaced, parallel axes, each of said rotatable members having a circular periphery concentric with one of said axes, both of said circular peripheries lying in a common plane, a spherical member positioned in engagement with said circular peripheries for rotation by said rotatable members, the first points of contact between said spherical member and said circular peripheries lying on a line intersecting said axes, and translating means responsive to the rotation of said spherical member having a circular periphery in engagement with said spherical member at a second point displaced from said first points, said common plane being tilted from the horizontal for urging said spherical member under the influence of gravity towards said second point.

11. In a measuring instrument, a spherical member, means for rotating said spherical member in accordance with a predetermined quantity, a substantially circular coupling member spaced from said spherical member, means mounting said circular coupling member for rotation about its axis, said coupling member having its circular surface substantially tangent to a reference line passing through the center of said spherical member, means mounting said coupling member for rotation about said reference line, and means coupling said coupling member to said spherical member for rotation in accordance with rotation of said spherical member.

12. In a measuring instrument, a spherical member, means for rotating said spherical member in accordance with a predetermined quantity, a substantially circular coupling member spaced from said spherical member, means mounting said circular coupling member for rotation about its axis, said coupling member having its circular surface substantially tangent to a reference line passing through the center of said spherical member, means mounting said coupling member for rotation about said reference line, and driving means for said coupling member comprising a driving member positioned adjacent said coupling member for rotation therewith about said axis, said driving member having a circular periphery in engagement with said spherical member.

13. In a measuring instrument, a spherical member, means for rotating said spherical member about an axis passing through the center of the spherical member and varying in angular position in accordance with a quantity to be measured, and measuring means responsive to the rotation of said spherical member including a first gear spaced from said spherical member, a disc element having a circular periphery in engagement with said spherical member, means mounting said disc element and said gear for rotation together about a common axis, a second gear operatively engaging said first gear, and means supporting said gears with the point of contact of their pitch lines substantially tangent to a reference line passing through the center of said spherical member, said supporting means including means mounting said first gear and disc element for rotation about said reference line.

14. In a measuring instrument, a first measuring means responsive to a first vector component of an alternating quantity to be measured, a second measuring means responsive to a second vector component of the quantity to be measured, said measuring means being so designed that said vector components are related to each other by an oblique angle, and translating means including a spherical member, first operating means controlled by said first measuring means and contacting said spherical member for rotating said spherical member, and second operating means controlled by said second measuring means and contacting said spherical member for rotating said spherical member, the angle included between the effective points of contact of said operating means and the center of said spherical member being substantially equal to said oblique angle.

15. In a measuring instrument, a spherical member, means for rotating said spherical member in accordance with a quantity to be measured, and translating means responsive to the rotation of said spherical member including a rider element having a circular periphery in engagement with said spherical member for rotation thereby, and means mounting said rider element for rotation with said circular periphery in a plane perpendicular to the axis of rotation of said spherical member, said plane being displaced from the center of said spherical member.

16. In a volt-ampere measuring instrument, a pair of axially aligned shafts, a first meter unit having an armature supported by a first one of said shafts, said first meter unit being responsive to a first vector-component of the volt amperes of an alternating current circuit, a second meter unit having an armature supported by a second one of said shafts, said second meter unit being responsive to a second vector-component equal to the vector difference between said volt amperes and said first vector-component, first driving means operatively connected for rotation by said first shaft, second driving means spaced from said first driving means and operatively connected for rotation by said second shaft, a spherical member engaging said first and second driving means for rotation thereby in accordance with the vector sum of the rotations of said driving means, means responsive to the rotation of said spherical member including a rider disc and a coupling gear mounted for rotation as a unit, with said rider disc in contact with said spherical member, means mounting said rider disc and said coupling gear for rotation about an axis tangent to the pitch line of said coupling gear and passing through the center of said spherical member, and indicating means responsive to the rotation of said coupling gear.

17. In a volt-ampere measuring instrument, a pair of shafts, means mounting said shafts for rotation, a first meter unit having an armature supported by a first one of said shafts, said first meter unit being designed to rotate said first shaft in accordance with a first vector-component of the volt-amperes of an alternating current circuit, a second meter unit having an armature supported by a second one of said shafts, said second meter unit being designed to rotate said second shaft in accordance with the vector difference between said volt-amperes and said first vector-component, first driving means connected for rotation by said first shaft, second driving means connected for rotation by said second shaft, and means for vectorially combining the rotations of said shafts, said last-named means comprising a spherical member disposed for rotation by said driving means, said first and second driving means having surfaces concentric with their axes of rotation positioned to engage said spherical member at spaced points, the surfaces of said driving means which rotate said spherical member being disposed substantially in a common plane which is tilted from the horizontal to urge said spherical member in a predetermined direction under the influence of gravity, and means responsive to the resultant rotation of said spherical member, said last-named means including an actuating member against which said spherical member is urged by gravity.

18. In a volt-ampere measuring instrument, a pair of shafts, means mounting said shafts for rotation, a first meter unit having an armature supported by a first one of said shafts, said first meter unit being designed to rotate said first shaft in accordance with a first vector-component of the volt-amperes of an alternating current circuit, a second meter unit having an armature supported by a second one of said shafts, said second meter unit being designed to rotate said second shaft in accordance with the vector difference between said volt-amperes and said first vector-component, first driving means connected for rotation by said first shaft, second driving means connected for rotation by said second shaft, and means for vectorially combining the rotations of said shafts, said last-named means comprising a spherical member disposed for rotation by said driving means, said first and second driving means having surfaces concentric with their axes of rotation positioned to engage said spherical member at spaced points, and means responsive to the resultant rotation of said spherical member, said last-named means comprising an actuating member and at coupling member mounted for rotation as a single unit about a first axis, said coupling member being spaced from said spherical member and having a surface substantially concentric with said first axis and tangent to a second axis passing through the center of said spherical member, and means mounting said single unit for rotation about said second axis, said actuating member having a surface concentric with said first axis and engaging said spherical member at a point displaced from a plane bisecting said spherical member, said plane containing said second axis and being perpendicular to said first axis, whereby the rotation of said coupling member is dependent on the volt-amperes of an alternating current circuit to which said meter units are connected.

19. In a volt-ampere measuring instrument, a pair of axially aligned shafts, a first meter unit having an armature supported by a first one of said shafts, said first meter unit being responsive to a first vector-component of the volt-amperes of an alternating current circuit, a second meter unit having an armature supported by a second one of said shafts, said second meter unit being responsive to a second vector-component equal to the vector difference between said volt-amperes and said first vector-component, first driving means operatively connected for rotation by said first shaft, second driving means spaced from said first driving means and operatively connected for rotation by said second shaft, a spherical member engaging said first and second driving means for rotation thereby in accordance with the vector sum of the rotations of said driving means, means responsive to the rotation of said spherical member including a rider disc and a coupling gear mounted for rotation as a unit, with said rider disc in contact with said spherical member, means mounting said rider disc and said coupling gear for rotation about an axis tangent to the pitch line of said coupling gear and passing through the center of said spherical member, and indicating means responsive to the rotation of said coupling gear, said indicating means including a second gear for engaging said coupling gear adjacent said axis, means mounting said second gear for rotation, said second gear having a pitch line substantially tangent to said axis, whereby said gears remain in coupling engagement as said coupling gear rotates about said axis, and volt-ampere indicating mechanism actuated by said second gear.

BENJAMIN H. SMITH.